No. 771,347. Patented October 4, 1904.

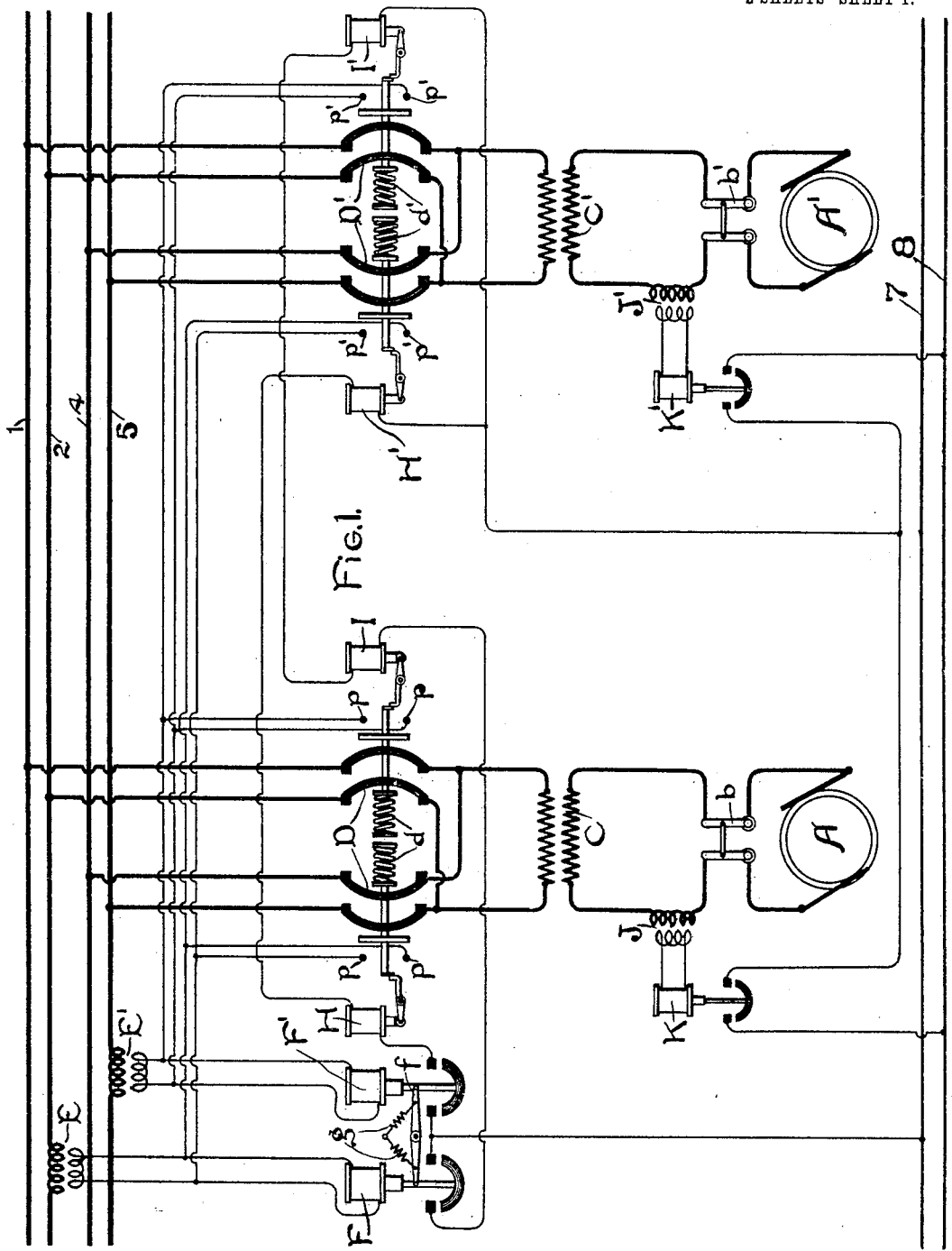

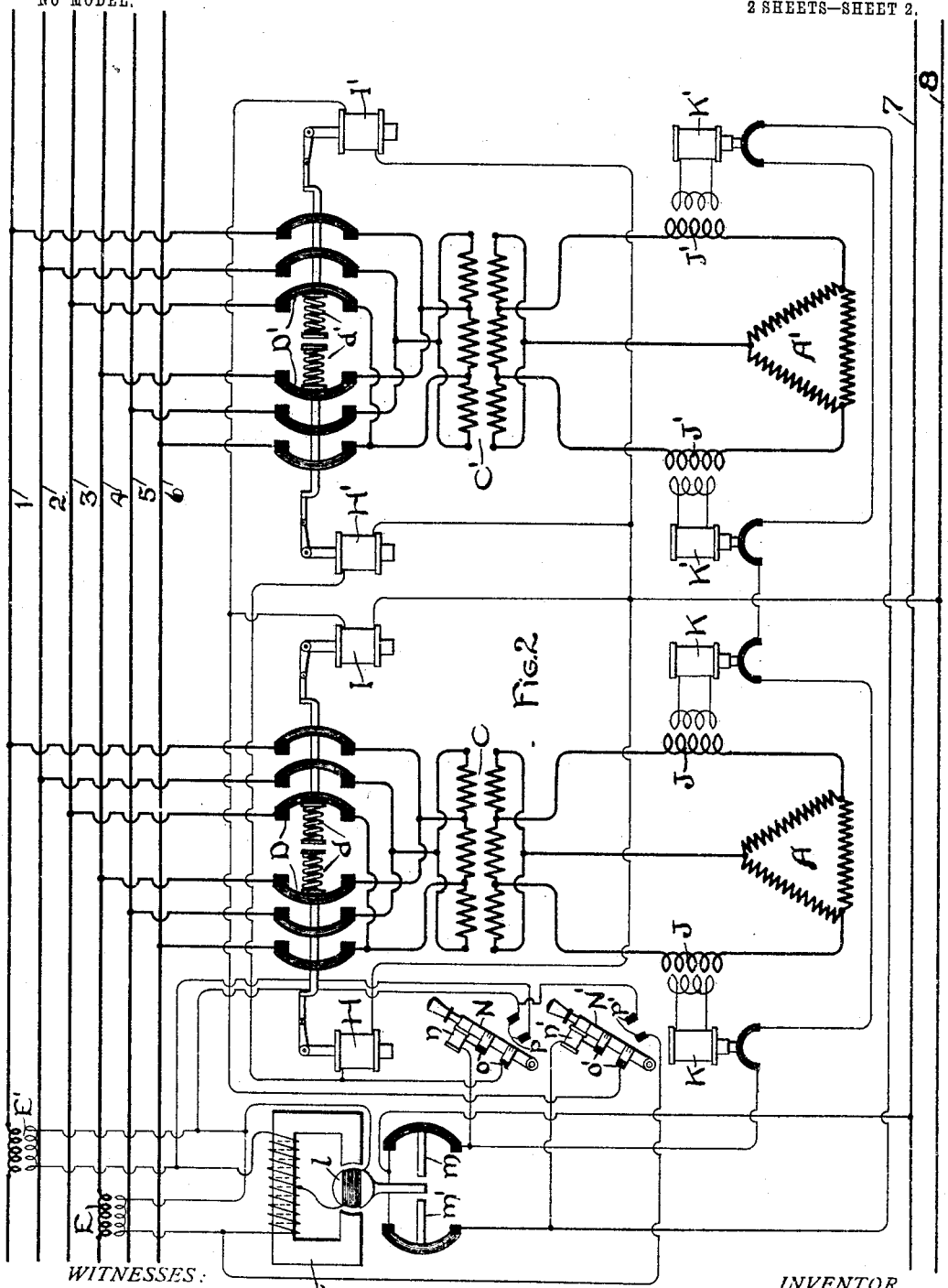

UNITED STATES PATENT OFFICE.

LEONARD WILSON, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

CONTROL SYSTEM FOR PARALLEL LINES.

SPECIFICATION forming part of Letters Patent No. 771,347, dated October 4, 1904.

Application filed November 20, 1903. Serial No. 181,925. (No model.)

*To all whom it may concern:*

Be it known that I, LEONARD WILSON, a subject of the King of England, and a resident of Pittsfield, Massachusetts, have invented certain new and useful Improvements in Control Systems for Parallel Lines, of which the following is a specification.

My invention relates to switching systems comprising automatic controlling and protective devices for parallel feeder systems.

It is the practice in nearly all large transmission systems of to-day to provide duplicate sets of feeders for the purpose of insuring continuity of service. If one set of feeders or transmission-lines breaks down, it may be cut out and the load carried by the other transmission-line or set of feeders without interruption of service. The maintenance of continuity is the most important point to be obtained in the operation of modern systems.

The object of my invention is to provide a system of controlling and protective devices for a system of parallel feeders or transmission-lines which shall meet the requirements of operation by insuring continuity of service.

In general, where two or more parallel transmission-lines are used if an accident happens to one of the lines it should be immediately cut out, provided the current caused by the short circuit in the faulty line is sufficient to overload the generators, and thus act as a detriment to the service either by producing an excessive voltage drop or by injuriously heating the generators. If, however, the fault or short circuit is not productive of an excessive flow of current, it is preferable that the faulty feeder should not be opened, but that the partial short circuit should be allowed to burn itself out and restore the line to its normal condition. Furthermore, if a short circuit should occur upon both or all sets of transmission-lines or feeders simultaneously the only chance of maintaining continuity of service is to maintain the feeders connected to the generators in the hope of burning out the short circuit or other fault, so as to restore the lines to their normal condition.

Broadly considered, my invention consists in an arrangement of controlling and protective devices arranged to cut out a faulty transmission-line or set of feeders, provided it is drawing such an excess of current as to overload the generators and also provided the other set or sets of transmission-lines are in a healthy condition. Under the conditions just given the faulty transmission-line or set of feeders is cut out, allowing the healthy feeders to carry the load and maintain the service without interruption. If, however, the fault upon one set of feeders is not sufficient to draw an injurious amount of current from the generators, the feeder is not cut out, but the short circuit is allowed to burn itself out or to increase until an excessive amount of current is produced thereby. Furthermore, if all the sets of feeders are simultaneously short-circuited the feeders are still maintained connected to the generators in order that an attempt may be made to burn out the short circuits and restore the lines to their normal conditions.

My invention will best be understood by reference to the accompanying drawings, in which—

Figure 1 shows diagrammatically a switching system arranged in accordance with my invention, and Fig. 2 shows a modification of the same.

In Fig. 1 two generators A A' are shown connected through switches $b$ $b'$ to the step-up transformers C C'. The high-tension sides of transformers C C' are connected, through the main switches D D', to the two parallel sets of feeders or transmission-lines 1 2 and 4 5. The generators are thus connected in parallel on the high-tension side of the transformers and the switching is done on the high-tension side, the switches $b$ $b'$ being inserted merely for the purpose of disconnecting the generators from the low-tension side of the transformers should occasion require. This arrangement of main switches I consider good practice; but it will be understood that it is not essential to my invention. My invention is equally applicable to generators parallelled on the low-tension side of the transformers. The leads from the generators to the transformers and from the transformers to the transmission-lines or feeders form the main circuit and are indicated in heavy lines. The remaining connections form the circuits for the controlling and protective devices and are shown by light lines.

E E' are series transformers inserted in the lines 2 and 5, respectively. The secondaries of these series transformers are connected to the solenoids or magnet-coils F F'. The cores of these solenoids are connected by the pivoted lever $f$, so that the pulls upon the two cores balance each other. The lever $f$ is normally held in a horizontal position by springs $g$.

H H' are two tripping-coils controlling the main switches D D', connected to the feeders 4 5. When coils H H' are energized and draw up their cores, left-hand switches D D' are opened by the left-hand compression-springs $d$ $d'$ disconnecting feeders 4 5 from the transformers C C'. In like manner coils I I' are the tripping-coils for the right-hand switches D D' and when energized disconnect feeders 1 2 from transformers C C'.

J J' are series transformers connected in the leads from generators A A' to transformers C C'. The secondaries of these series transformers are connected to the magnet-coils or solenoids K K', each controlling a switch which is normally open.

Bus-bars 7 8 represent the source of current for the control system. Starting from bus-bar 7, one lead runs to the switches which are operated by the two solenoids F F' and which are normally open, as shown in the drawings. The other contacts of these switches are connected to the solenoids I I' in series and H H' in series, respectively. The other terminals of coils H' and I' are connected to a common lead which runs to the switches controlled by the solenoids K K', which are also normally open. The other contacts of these switches are connected to bus-bar 8. Thus it is seen that the control-circuit connected across bus-bars 7 8 is held normally open both by the switches controlled by solenoids F F' and by those controlled by solenoids K K'. This condition remains as long as the currents in the two sets of feeders are equal, since in that case coils F F' exert opposing and balanced pulls upon their cores. If now one set of feeders, as 1 2, becomes short-circuited, the current in solenoid F will be greater than that in coil F'. The core of solenoid F will consequently be drawn up and the switch controlled thereby will be closed, thus connecting tripping-coils I I' to bus-bar 7. The circuit of tripping-coils I I' is, however, still open as long as the switches controlled by solenoids K K' are open. Thus although one set of feeders is taking an excess of current it will not be disconnected from the transformers as long as the current drawn from generators A A' is not excessive.

If, however, one or both generators are overloaded by this excess current, solenoid K or K', or both, will draw up their cores connecting tripping-coils I I' to bus-bar 8, and thus closing their circuit. Tripping-coils I I' will accordingly be energized, their cores will be drawn up, and right-hand switches D and D' will be opened by the right-hand compression-springs $d$ $d'$. The faulty feeders 1 2 will consequently be disconnected from the transformers C C'.

After feeders 1 2 are open-circuited no current will be flowing through transformer E. In order to prevent the current of transformer E' energizing solenoid F' so as to close the circuit through tripping-coils H H', the auxiliary contacts $p$ $p'$ are provided arranged to be engaged by a bridging member carried by main switches D and D'. When these contacts are bridged by this member, the secondary of transformer E' is short-circuited, and the differential relay formed by the solenoids F F' is thus rendered inoperative. It will thus be seen that the faulty set of feeders is with certainty cut out if it alone is short-circuited and if the current caused by the short circuit is excessive. Thus the requirements of service as laid down in the first part of this specification are completely met.

Fig. 2 shows a modified arrangement in which a different form of differential relay is used and in which the control-circuit is normally closed instead of normally open. In this figure three-phase generators, transformers, and transmission-lines are shown, with overload-relays K K' provided for two of the three leads, as is customary in three-phase work. Considering first the differential relay L, it will be seen that it is a relay of the motor type, the field being connected to the secondaries of the transformers E E' in such manner that the currents from said secondaries flow through equal parts of the field-winding in opposite directions. Thus under normal conditions when the current in the two sets of feeders is equal no magnetic resultant is produced by field-winding of relay L. The armature $l$ is connected across the two secondaries of transformers E E' in parallel, so that it receives the sum of these currents and is consequently at all times energized. The armature $l$ is arranged to open switch $m$ or $m'$ when moved in either direction. It will be seen that the control-circuit is closed as follows: from bus-bar 7 to switches $m$ $m'$ in parallel. Here the circuit divides, one part passing from switch $m$, through magnet-coil $n$, through switch N, through tripping-coils H H' in parallel, to bus-bar 8. From switch $m'$ the current passes through magnet-coil $n'$, through switch N', through tripping-coils I I' in parallel to bus-bar 8. There is also a circuit from switch $m$ to switch $m'$ through the several switches in series controlled by solenoids K K'. Tripping-coils H H' and I I' are arranged to hold the main switches D D' closed as long as said tripping-coils are energized. When said tripping-coils are open-circuited, allowing their cores to fall, switches D D' are opened by compression-springs $d$ $d'$. The operation is then as follows: If one set of feeders becomes short-circuited, the current in the two parts of the field-winding of differential relay L will no longer be equal and resultant magnetism will be produced and armature $l$ will tend to revolve, opening one of the switches $m$ $m'$. If armature $l$ is turned in an anti-clockwise direction, switch $m$, which is in series with tripping-coils H H', will be opened. Tripping-coils H H', however, will still be energized, since current will flow from the lower contact of switch $m'$, through the switches controlled by solenoids K K', back to switch N, and thence through tripping-coils H H'. Thus as long as the current drawn from generators A A' is not excessive tripping-coils H H' will not act. If, however, an undue amount of current is drawn from either or both generators, solenoids K or K', or both, will open, thus opening the circuit between switches $m'$ and $m$. Tripping-coils H H' will then be deënergized, their cores will fall, and the left-hand main switches D D' will be open by the left-hand compression-springs $d$. Thus the same object is achieved by means of the closed control-circuit as was obtained by the normally open control-circuit of Fig. 1. The switches N and N' are provided to permanently open the circuits of the tripping-coils when once the tripping-coils have been deënergized. Switch N is connected in series with the tripping-coils H H' and is normally held closed by the magnet-coil $n$, which is also in series with said tripping-coils. Thus when tripping-coils H H' are deënergized magnet-coil $n$ will also be deënergized, allowing switch N to fall, permanently opening the circuit of tripping-coils H H' at contacts $o$. Thus if switch $m$ should be again closed when armature $l$ returns to its normal position, as shown in the drawings, upon the open-circuiting of one of the duplicate transmission-lines the tripping-coils H H' will remain deënergized until switch N is again closed. Switches N and N' in their open position bridge contacts $p$ $p'$. These contacts serve the same purpose as the contacts similarly lettered in Fig. 1—that is, to short-circuit the secondary of the series transformer in the healthy line after the other line has been cut out. The purpose of this short-circuiting has already been described.

I have illustrated and described my system with two different forms of differential relay and with two different arrangements of control-circuit connections. Other forms of relays and other arrangements of control-circuits may be substituted for those shown without departing from the spirit of my invention. For instance, although I have shown the overload devices connected in the leads from the generators to the low-tension sides of the transformers these devices may be connected in any other parts of the circuits in which the currents vary in proportion to the currents which it is desired to limit by these devices. Furthermore, although I have shown a specific means for the simultaneous tripping of the main switches, consisting of separate relays connected in the same circuit, and although I have shown a specific arrangement for electrically interlocking the differential relay and the overload devices nevertheless any well-known and equivalent arrangement may be substituted for these specific arrangements without departing from my invention. Furthermore, though I have shown my invention applied to two generators and two sets of transmission-lines it will be understood that it is in no way limited to this particular number. Accordingly I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In combination, parallel transmission-lines, a generator connected thereto, a device operative upon unbalancing of current-flow in said lines, a device operative upon a predetermined excess current-flow in said generator, and means dependent upon said devices and adapted to open the circuit of one of said lines.

2. In combination, parallel transmission-lines, a generator connected thereto, a differential relay energized by the current in said lines, a device operative upon an overload of said generator, and means dependent on the joint action of said relay and said device and adapted to open the circuit of one of said lines.

3. In combination, parallel transmission-lines, a generator, switches connecting said generator to said lines, a differential relay energized by the currents in said lines, a relay operative upon an overload of said generator, and tripping devices for said switches controlled by said relays.

4. In combination, parallel transmission-lines, a generator connected thereto, and means operative upon an unbalancing of current-flow in said lines and excess current-flow from said generator and adapted to disconnect said generator from one of said lines.

5. In combination, parallel transmission-lines, a plurality of generators connected thereto, and means operative upon an unbalancing of current-flow in said lines and a predetermined excess current-flow in a generator or generators and adapted to disconnect all of said generators from one of said lines.

6. In combination, parallel transmission-lines, a plurality of generators connected thereto, a mechanism operative upon unbalancing of current-flow in said lines, devices operative upon a predetermined excess current-flow in a generator or generators, and means dependent upon said mechanism and said devices and adapted to disconnect said generators from one of said lines.

7. In combination, parallel transmission-lines, a plurality of generators connected thereto, a differential relay energized by the currents in said lines, overload devices in circuits in which the current varies with the current in a generator or generators, and means dependent on the joint action of said relay and said devices and adapted to disconnect said generators from one of said lines.

8. In combination, parallel transmission-lines, a generator, switches connecting said generator to said lines, and a control system for said switches arranged to operate said switches to disconnect said generator from one of said lines upon an unbalancing of current-flow in said lines and an overloading of said generator.

9. In combination, parallel transmission-lines, a plurality of generators, switches connecting said generators to said lines, and a control system for said switches arranged to operate said switches to disconnect said generators from one of said lines upon an unbalancing of current-flow in said lines and an overloading of one or more of said generators.

10. In combination, parallel transmission-lines, a generator, switches connecting said generator to said lines, tripping-coils for said switches, a differential relay energized by the currents in said lines, and an overload device for said generator, said relay and said device being arranged to vary, when simultaneously operated, the circuits of said tripping-coils.

11. In combination, parallel transmission-lines, a generator, switches connecting said generator to said lines, and a control-circuit comprising operating devices for said switches and switches respectively operative upon an unbalancing of current-flow in said lines and upon a predetermined excess current-flow in said generator.

12. In combination, a transmission system comprising parallel lines and generators connected thereto, and a control system comprising means for varying the connections of said transmission system upon a simultaneous unbalancing of current-flow in said lines and a predetermined excess current-flow in a generator or generators.

Signed at Pittsfield, Massachusetts, this 14th day of November, 1903.

LEONARD WILSON.

Witnesses:
L. A. HAWKINS,
R. E. HAYNES.